US009059802B2

(12) United States Patent
Tipton et al.

(10) Patent No.: US 9,059,802 B2
(45) Date of Patent: Jun. 16, 2015

(54) RECEIVED SIGNAL STRENGTH INDICATOR SNAPSHOT ANALYSIS

(75) Inventors: Rick Tipton, Corryton, TN (US); Mark Austin, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 396 days.

(21) Appl. No.: 13/292,736

(22) Filed: Nov. 9, 2011

(65) Prior Publication Data
US 2013/0115888 A1 May 9, 2013

(51) Int. Cl.
H04B 17/00 (2006.01)
H04W 24/08 (2009.01)
H04W 24/00 (2009.01)
H04W 52/02 (2009.01)
H04W 4/02 (2009.01)
G01S 5/02 (2010.01)

(52) U.S. Cl.
CPC .............. H04B 17/382 (2015.01); H04B 17/26 (2015.01); H04B 17/318 (2015.01)

(58) Field of Classification Search
CPC .............. H04B 17/00; H04B 17/0057; H04B 17/0007; H04W 52/0225; H04W 52/0245; H04W 52/0248
USPC .......................... 455/41.2, 41.3, 67.11, 456.1
See application file for complete search history.

(56) References Cited

U.S. PATENT DOCUMENTS 7,400,604 B2    7/2008  Lee
7,738,884 B2 *  6/2010  Cheung et al. ............. 455/456.3
7,945,271 B1 *  5/2011  Barnes et al. ............... 455/456.1
8,320,285 B2   11/2012  Kitani
2003/0008668 A1 *  1/2003  Perez-Breva et al. ......... 455/456
2004/0052231 A1 *  3/2004  Ramaswamy et al. ........ 370/338
2004/0090943 A1   5/2004  Da Costa et al.

(Continued)

FOREIGN PATENT DOCUMENTS

JP    2008118722 A    5/2008
JP    2008312067 A   12/2008

(Continued)

OTHER PUBLICATIONS

Taheri et al. (Taheri, A.; Singh, A.; Emmanuel, A., "Location fingerprinting on infrastructure 802.11 wireless local area networks (WLANs) using Locus," Local Computer Networks, 2004. 29th Annual IEEE International Conference on , vol., no., pp. 676,683, Nov. 16-18, 2004 doi: 10.1109/LCN.2004.74).*

(Continued)

Primary Examiner — Wesley Kim
Assistant Examiner — Devan Sandiford
(74) Attorney, Agent, or Firm — Amin, Turocy & Watson, LLP

(57) ABSTRACT

The disclosed subject matter provides for received signal strength indicator (RSSI) snapshot analysis. RSSI snapshot analysis can be independent of determining location/map information. An RSSI snapshot can be analyzed in view of historic RSSI information to determine a probability that a local wireless resource correlated with the historical RSSI information is instantly available. Machine learning can be employed to train an inference component to facilitate in determining the probability. In an aspect, the state of a wireless radio can be controlled based on the probability and this can reduce the energy consumption of the user equipment by facilitating intelligent enablement of a wireless radio.

20 Claims, 10 Drawing Sheets

(56) References Cited

U.S. PATENT DOCUMENTS

| | | | |
|---|---|---|---|
| 2005/0020278 | A1* | 1/2005 | Krumm et al. ............. 455/456.1 |
| 2005/0048986 | A1 | 3/2005 | Zhao |
| 2006/0181413 | A1 | 8/2006 | Mostov |
| 2006/0209882 | A1 | 9/2006 | Han et al. |
| 2006/0217147 | A1* | 9/2006 | Olvera-Hernandez et al. ......................... 455/552.1 |
| 2006/0280226 | A1 | 12/2006 | Krasner |
| 2007/0008925 | A1 | 1/2007 | Dravida et al. |
| 2008/0132239 | A1 | 6/2008 | Khetawat et al. |
| 2008/0165680 | A1* | 7/2008 | Chang ........................ 370/230 |
| 2008/0205358 | A1 | 8/2008 | Jokela |
| 2008/0207222 | A1* | 8/2008 | Bhattacharya et al. .... 455/456.1 |
| 2008/0305786 | A1 | 12/2008 | Arumi et al. |
| 2009/0042557 | A1 | 2/2009 | Vardi |
| 2009/0111485 | A1 | 4/2009 | Kitani et al. |
| 2009/0182533 | A1 | 7/2009 | Neuenschwander et al. |
| 2009/0196268 | A1 | 8/2009 | Caldwell et al. |
| 2009/0268654 | A1 | 10/2009 | Baglin |
| 2010/0085947 | A1* | 4/2010 | Ringland et al. ............. 370/338 |
| 2010/0110921 | A1 | 5/2010 | Famolari |
| 2011/0153816 | A1 | 6/2011 | Lloyd et al. |
| 2012/0149388 | A1* | 6/2012 | West et al. ................. 455/456.1 |
| 2012/0286997 | A1* | 11/2012 | Lin et al. ...................... 342/451 |
| 2013/0226857 | A1* | 8/2013 | Shim et al. ...................... 706/52 |

FOREIGN PATENT DOCUMENTS

| | | | |
|---|---|---|---|
| JP | 2009135708 | A | 6/2009 |
| JP | 2009152899 | A | 7/2009 |
| JP | 2009159408 | A | 7/2009 |
| JP | 2009-246874 | A | 10/2009 |
| JP | 2010-114774 | A | 5/2010 |

OTHER PUBLICATIONS

Derr, et al., "Wireless Indoor Location Estimation Based on Neural Network RSS Signature Recognition (LENSR)". 3rd IEEE Conference on Industrial Electronics and Applications, Jun. 2008, 7 pages.

Takenga, "Received Signal Strength based Fingerprint Positioning in Cellular Networks involving Neural Networks and Tracking Techniques". (2007) 9 pages.

Simonite, "Bringing Cell-Phone Location-Sensing Indoors". Technology review published by MIT, Aug. 31, 2010, 2 pages.

"Point Inside Technologies". © 2011, Piont Inside Inc. http://pointinside.com/products-services/overview/ , Jul. 17, 2011, 3 pages.

Manzuri, et al., "Mobile Positioning using Enhanced Signature Database Method and Error Reduction in Location Grid". 2009 International Conference on Communications and Mobile Computing.

"Radar". Microsoft research. http://research.microsoft.com/en-us/projects/radar/default.aspx , Jul. 17, 2011, 3 pages.

Siddiqi, "Experiments in Monte-Carlo Localization using WiFi Signal Strength", Jul. 20, 2011, 8 pages.

"Determining your location using only wifi signals". http://stackoverflow.com/questions/524351/determining-your-location-using-only-wifi-signals, Jul. 17, 2011, 3 pages.

Zaruba, et al., "Indoor location tracking using RSSI readings from a single Wi-Fi accessed point" Jun. 8, 2006 © Springer Science+Business Media, LLC 2006, 15 pages.

International Search Report for PCT/US2011/037332, published Nov. 24, 2011, 3 pages.

OA dated Jan. 30, 2013 for U.S. Appl. No. 12/883,145, 25 pages.

3GPP TS 24.302 V8.1.0, Mar. 2009, Access to 3GPP EPC via non-3GPP access networks, 43 pages.

3GPP TS 25.305 V8.1.0, Dec. 2008, Stage 2 functional specification of User equipment positioning in UTRAN, 79 pages.

OA dated Aug. 15, 2012 for U.S. Appl. No. 12/883,145, 40 pages.

Japanese Office Action dated Apr. 3, 2014 for Japanese Patent Application No. 2013-511386, 6 pages.

Office Action dated Dec. 30, 2014 for U.S. Appl. No. 14/040,428, 32 pages.

Japanese Office Action, mailed Jan. 29, 2015, for Japanese Patent Application No. 2013-511386, 13 pages (with translation).

* cited by examiner

RECEIVED SIGNAL STRENGTH INDICATOR SNAPSHOT ANALYSIS

CROSS-REFERENCE TO RELATED APPLICATIONS

This application is related to U.S. patent application Ser. No. 12/883,145, "Wi-Fi Intelligent Selection Engine", filed Sep. 15, 2010, which is hereby incorporated by reference in its entirety.

TECHNICAL FIELD

The disclosed subject matter relates to analysis of radio frequency (RF) resources and, more particularly, to the analysis of the RF resources in view of historical RF information to determine a probability of a local wireless resource being available.

BACKGROUND

Mobile devices such as cellular telephones, PDAs, etc. are proliferating like never before. Almost everyone has some sort of mobile device, and some people have multiple devices. Users can access several different networks using a single mobile device, and can access voice, text, and multimedia data from other network entities such as servers and other mobile devices. Further, mobile device complexity is increasing, with more and more advanced and power efficient processors, display interfaces, and applications to provide a user experience like never before. Such devices include, for instance, the iPhone, iPad, Droid, and other PDAs/netbooks. Consequently, users are using their mobile devices more frequently, and have larger bandwidth requirements for data, email, voice, etc.

This increased usage puts an increased strain on the wireless networks that provides these services. Even with the advent of 3G and 4G networks that use Internet Protocol (IP) addressing, Session Initiation Protocol (SIP), etc., there are certain network elements that get overwhelmed and can create a bottleneck for data flow, such as cellular base stations (or NodeBs) and their associated gateways. Several users within the range of one or more base stations who are downloading high-volume data from the network will have greater transmission power requirements from the base station. This may cause reduced signal strength per mobile device, and consequently a lower quality connection. Transmission power control can alleviate some but not all of these issues. This further causes higher battery usage on the mobile device itself.

Network operators generally offer alternative means to connect to their core networks, or to the Internet. Femtocells, Fiber-to-the-node, and wireless local area network (WLAN or Wi-Fi) access points can provide access to various networks for mobile devices having more than one type of transceiver. For instance, the iPhone includes a Wi-Fi transceiver. A Wi-Fi hotspot access point can be used to connect to a network, with broadband speeds, and the load on the cellular network can be reduced. However, there are specific issues that prevent the efficient selection of an access point. For instance, many users appear to disable Wi-Fi, for example, due to concerns over battery life. Consequently, users often do not enable Wi-Fi as they may forget to turn it off afterwards. Leaving Wi-Fi on can lead to faster battery drainage, while leaving it off can lead to connectivity issues as well as sub-optimal power usage as the cellular transceiver may have to use more power for high-throughput communication with a base station.

Conventional techniques for determining the availability of local wireless resources, e.g., Wi-Fi hotspots, etc., typically rely on scanning for those resources or accessing location-centric data maps of those resources. Scanning for local wireless resources can be energy intensive and can be associated with shortened periods of time between recharging cycles in battery operated user equipment (UE). Scanning generally is associated with a radio, adapted to operate at the frequencies of the local wireless resource, being in an 'on' or 'active' state. The active radio then listens for handshake signals from any available local wireless resources at the related frequencies. Where a handshake signal is detected, the UE can then follow predetermined procedures related to detecting the handshake, such as forming a communicative link with the detected local wireless resource. As a readily appreciated example, a smartphone can have a Wi-Fi radio left on such that, as the smartphone enters a detected region of Wi-Fi coverage, the smartphone can attempt to log into the Wi-Fi resource. It will also be appreciated that leaving the exemplary smartphone Wi-Fi radio on typically results in an increase in battery drain.

Location-centric techniques that access maps of local resources can be employed to selectively activate (or deactivate) energy intensive components based on the location of a UE. This can decrease the rate at which a UE battery would be discharged in comparison to leaving a radio on in a 'scanning' mode. As an example, a GPS-enabled phone can access a map of Wi-Fi hotspot locations. Where the phone is determined to be at a particular location correlating to a location on the map associated with a Wi-Fi resource, the phone can activate a Wi-Fi radio. Similarly, where the phone is determined to be at a particular location correlating to a location on the map not associated with a Wi-Fi resource, the phone can deactivate the Wi-Fi radio to conserve energy and prolong battery usage. While improving battery usage, location-centric techniques foreseeably rely on maps of local wireless resources and a location determination component to correlate the UE position to a location on the map. As such, map data would be compiled and then accessed by a UE to determine if a local wireless resource is available. Moreover, determining a location can require computational resources. Further, some UEs may not be equipped to determine a location for a location-centric determination of the availability of local wireless resources.

The above-described deficiencies of conventional mobile device location data sources for transportation analytics is merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to analysis that determines a probability that a local wireless resource is available based on one or more received signal strength indicator and historical received signal strength indicator information. In an embodiment, a system can comprise a capture component to receive signal strength indicator information that can be associated with user equipment such as a mobile device, for instance a mobile phone. The exemplary system can further comprise a historical information component to receive historical signal strength indicator information. An analysis component of the exemplary system can determine a probability based on an analysis of the signal strength indicator information and historical signal strength indicator information.

In a further embodiment, a method comprises receiving signal strength indicator information associated with a user equipment and receiving historical signal strength indicator information. The example method further comprises determining a probability based on the signal strength indicator information and the historical signal strength indicator information.

In another example embodiment, a computer-readable storage medium comprises instructions for receiving signal strength indicator information associated with a user equipment and receiving historical signal strength indicator information. Receiving historical signal strength indicator information can include receiving information relating to a correlated historically available local wireless resource. The computer-readable storage medium further comprises instructions for determining a probability based on the signal strength indicator information and the historical signal strength indicator information. The probability can be related to the present availability of the correlated historically available local wireless resource.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
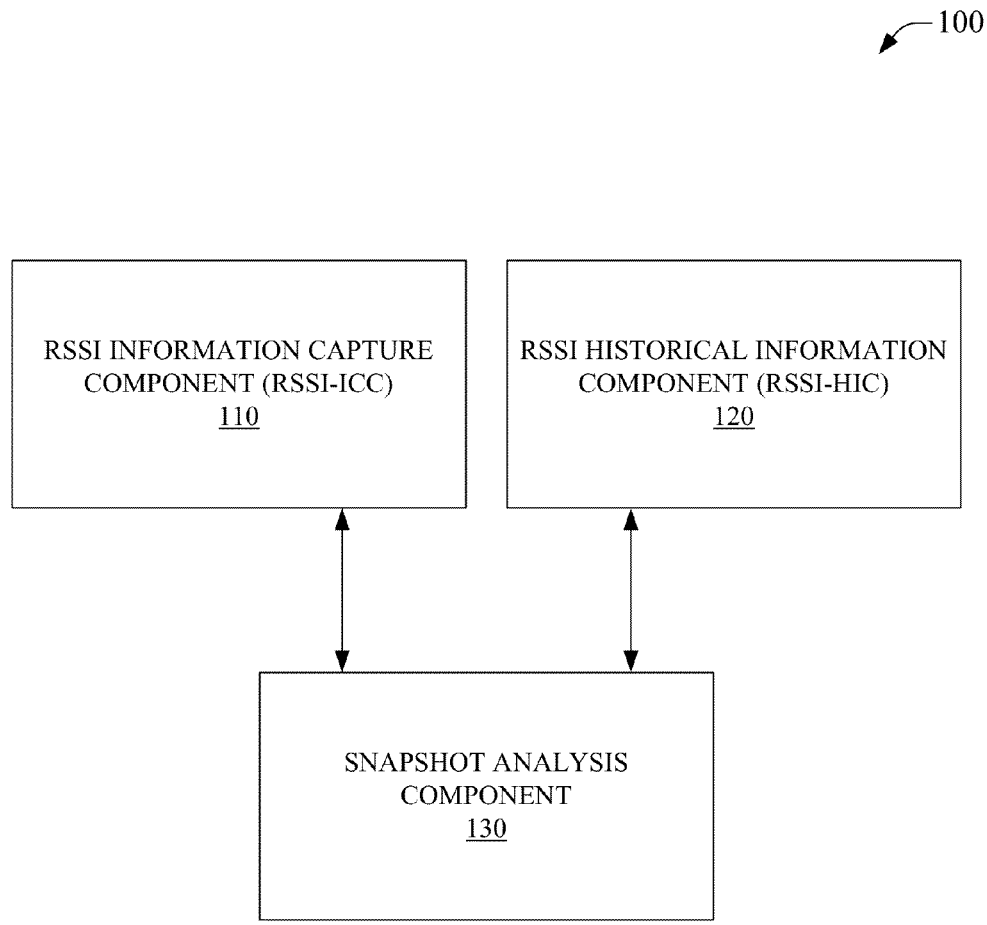
FIG. 1 is an illustration of a system that facilitates RSSI snapshot analysis in accordance with aspects of the subject disclosure.

The presently disclosed subject matter illustrates received signal strength indicator (RSSI) snapshot analysis. RSSI is a radio receiver metric that relates to the relative received signal strength in a wireless environment, an indication of the power level being received by an antenna. As such, the higher the RSSI value or less negative the RSSI value, the stronger the signal. A RSSI value can be associated with a wireless radio signal for a wireless network carrier resource, for instance, a RSSI value can be associated with a signal received from a cell tower.

RSSI values can be readily affected by geometric and environmental factors. Geometric factors related to the attenuation of a radio signal as a function of distance from the source of the radio signal. As such, a RSSI value will generally fall off as the distance between the transmitter and receiver increases. As an example, the further a cellular phone is from a cell tower, the lower the RSSI value associated with that cell tower with typically be.

Environmental factors can also significantly affect a RSSI value. Environmental factors can include, weather, humidity, pollution levels, electromagnetic (EM) interference, trees, buildings, vehicles, UE antenna orientation, etc. As such, RSSI values generally change over time as an environment evolves. Given that real world environments are often constantly undergoing change, RSSI values would also experience fluctuation.

In a truly static environment, a RSSI value might be expected to be similarly static. In a truly static environment, a RSSI value would then be the same where the receiver, e.g., a UE, is in the same geometric orientation. Thus, for a UE, a 'snapshot' of RSSI values can be captured for a plurality of signal sources that would reflect only the geometric orientation of the UE where the environment is static. Data indicating the presence of a local wireless resource can be correlated to sets of RSSI values. Where the snapshot matches a set of RSSI values correlated to a local wireless resource, a static RSSI snapshot analysis, a presumption can be made that the wireless resource is available. This presumption can be similar to asserting that a wireless resource is located at a particular location but is different from that assertion in that a location is never actually determined when employing a static RSSI snapshot analysis. This static RSSI snapshot analysis is only valid where the RSSI is variable only as a function of geometric orientation. Where environmental factors are considered, the RSSI snapshot is likely to differ from historical RSSI data for the same geometric orientation.

Analysis of an RSSI snapshot, the RSSI snapshot including information for one or more RSSIs, can still be useful by applying a probability to the likelihood of a local wireless resource being available for a RSSI snapshot compared to historical RSSI information. As an example, for a cellphone used at a worker's desk each day, the RSSIs at the desk from several cell towers may vary only by a few dB. The RSSI snapshot each day can be correlated with the presence of an office Wi-Fi resource. A RSSI snapshot can be captures and compared to the historical RSSI information, and while a perfect match may not be found, it is possible that the RSSI snapshot can still be unique enough to allow for a determination that it is probable the office Wi-Fi is available. Similarly, where the same cellphone captures a RSSI snapshot in the lobby of the building, the RSSI snapshot can be sufficiently different from that historically associated with the office Wi-Fi resource, e.g., the snapshots associated with the desk location, that a low probability can be determined that the office Wi-Fi is available. Determining a probability of a local wireless resource being available can be employed by a UE to change the state of a wireless radio, such as turning a radio on or off based on the determined probability. Continuing the previous example, where the RSSI snapshot in the lobby of the office has a low probability, the cellphone Wi-Fi radio can be kept off, but when the cellphone arrives at the desk and an RSSI snapshot is employed in determining a high probability of the office Wi-Fi being available, the cellphone Wi-Fi radio can be turned on to facilitate logging onto the office Wi-Fi resource.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of a system 100, which facilitates RSSI snapshot analysis in accordance with aspects of the subject disclosure. System 100 can include RSSI information capture component (RSSI-ICC) 110. RSSI-ICC 110 can facilitate capturing RSSI information. In an aspect, this RSSI information can be associated with a set of RF signals. The set of RF signals can include RSSI information for one or more RF signals or can be for an empty set of no RF signals. The RSSI information can be interchangeably referred to as a 'snapshot' or 'RSSI snapshot' for a set of RF signals at a particular point in time. As an example, RSSI-ICC 110 can receive RSSIs for five cell towers and these RSSIs can comprise a snapshot of the RSSI information for the set of five cell towers at a first time, t=0. A second snapshot can be for the same five cell towers at a second time, t=1. A third snapshot can be for three of the five cell towers at t=0. A fourth exemplary snapshot can be of five different cell towers at t=0. Numerous other examples of a snapshot are to be appreciated as within the scope of the presently disclosed subject matter despite not being explicitly recited for clarity and brevity. It will be noted that a RSSI snapshot is not necessarily associated with any particular location and rather can be simply a collection of RF signal information at a particular time. The snapshot can theoretically match a plurality of location wherein those locations each exhibit highly similar RF signal information although this is highly unlikely. By employing a RSSI snapshot that is independent of an ascertained location, the RSSI snapshot can be analyzed without needing to be correlated to map-type information or location-type information. As an example, a snapshot can be directly compared with historical RSSI information without first converting it to location information as is more conventionally done. An exemplary RSSI-ICC 110 can be a wireless radio in a mobile phone, wherein the wireless radio can receive a wireless radio signal and can determine a relative signal strength for that wireless radio signal. It is to be noted that numerous other examples of RSSI-ICCs can be recited but are not herein for the sake of clarity and brevity.

System 100 can also include RSSI historical information component (RSSI-HIC) 120. RSSI-HIC 120 can allow system 100 to receive historical RSSI information. Historical RSSI information can be any type of RSSI information pertinent to an analysis of one or more snapshots from RSSI-ICC 110. Historical RSSI information can include identifiers associated with a signal source, dates, times, associated environmental conditions, RSSI historic values, RSSI historic averages, RSSI historic deviation, etc. Historical RSSI information can also include information correlating one or more local wireless resources with RSSI information. This correlating information can include an identifier for a local wireless resource, a status for a local wireless resource, an access protocol for a local wireless resource, one or more service metrics for a local wireless resource such as min/max throughput, average bandwidth, quality of service (QoS), level of service (LoS), etc., cost metrics for a local wireless resource, etc. In an embodiment, RSSI-HIC 120 can receive historical RSSI information that can facilitate a direct comparison with one or more RSSI snapshots. In another embodiment, RSSI-HIC 120 can receive historical RSSI information that can be employed in determining an inference that can be employed in an analysis related to a RSSI snapshot. An exemplary RSSI-HIC 120 can be a data store in a mobile device that is at least partially porpulated with historical RSSI information. A second exemplary RSSI-HIC 120 can be a data store located at a radio access network (RAN) component, for instance a NodeB, that can source historic RSSI information to other components of a radio access network associated with the RAN. It will be noted that numerous other examples of RSSI-HICs can be recited but are not explicitly recited here for the sake of clarity and brevity.

RSSI-ICC 110 and RSSI-HIC 120 can be communicatively coupled to snapshot analysis component 130. Snapshot analysis component 130 can analyze a RSSI snapshot to determine a probability that a local wireless resource is available. This analysis can employ historical RSSI information, such as that received by RSSI-HIC 120. In an embodiment, an analysis can compare a RSSI snapshot to historical RSSI information to find a match. Where a match is found with an RSSI snapshot, it can be determined that local wireless resources related to the historical RSSI information can be available. This determination can be made accessible, such as, to a UE. Where local wireless resources are determined to be available, the exemplary UE can switch an appropriate radio on to attempt to access the available wireless resource. This can allow the exemplary UE to keep radios in an off or low-power state until a local wireless resource is determined to be available based on an RSSI snapshot matching historical RSSI information, which can result in reduced energy consumption and improved battery performance for the UE. An exemplary snapshot analysis component can be a processor of a mobile phone executing snapshot analysis instructions, a dedicated circuit in a mobile device performing snapshot analysis, etc. It will be noted that numerous other examples of snapshot analysis components can be recited but are not herein for the sake of clarity and brevity.

In another embodiment, the analysis can compare the RSSI snapshot to historical information to determine a probability of a local wireless resource being available. The probability can be based on similarities and differences between the RSSI snapshot and the historical RSSI information. As an example, where the RSSI snapshot has 100 RSSI values and 99 match historical RSSI information, there can be a high probability of any correlated local wireless resources being available. As a second example, where the RSSI snapshot has two RSSI values and they are an order of magnitude different form the historical RSSI information a low probability of any correlated local wireless resources being available can be determined. As a third example, where five RSSI values compose the snapshot and they are each within 3% of a historical set of RSSI information, a moderately high probability for a related local wireless resource being available can be determined. As a fourth example, if the snapshot contains RSSI values strongly in accord with historical RSSI information and there is no correlated local wireless resource, a very low probability of availability can be determined Of note, numerous other examples are within the present scope despite not being enumerated for clarity and brevity.

Figure 2:
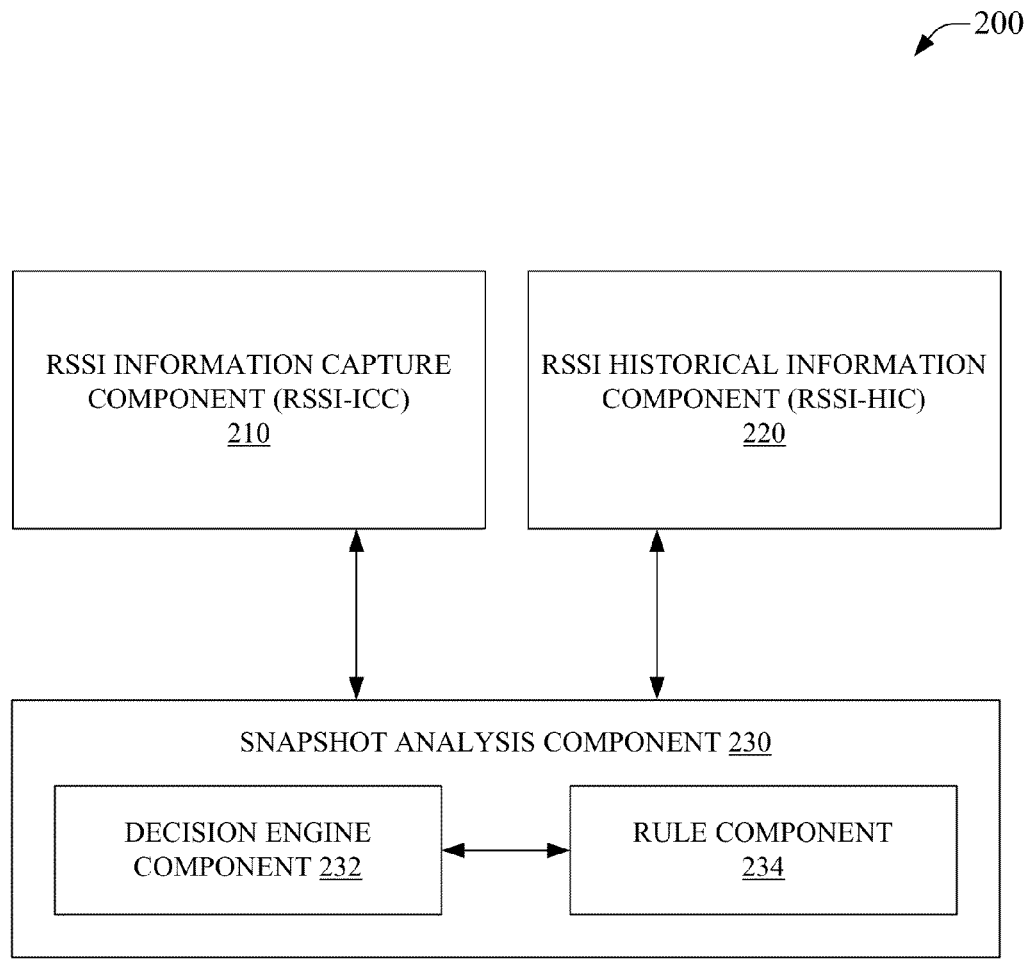
FIG. 2 is a depiction of a system that facilitates RSSI snapshot analysis in accordance with aspects of the subject disclosure.

FIG. 2 is a depiction of a system 200, which can facilitate RSSI snapshot analysis in accordance with aspects of the subject disclosure. System 200 can include RSSI-ICC 210. RSSI-ICC 210 can facilitate capturing RSSI information. RSSI information can include RSSIs for a plurality of received RF signals. The RSSI information can be a set of RSSIs for one or more received RF signals or can be an empty set, such as where there are no received RF signals. For instance, the RSSI information can be a set of RSSIs for three NodeBs. The RSSI information received with the assistance of RSSI-ICC 210 can be independent of actual location information.

System 200 can also include RSSI-HIC 220. RSSI-HIC 220 can assist system 200 to receive historical RSSI information. Historical RSSI information can include one or more historic RSSI snapshots. Historical RSSI information can also include other RSSI information such as identification information of historically received RF signals, identification information for correlated local wireless resources, etc. In an embodiment, historical RSSI information can include any information that can facilitate an analysis of a current RSSI snapshot to determine a probability related to the availability of a local wireless resource. As an example, historic RSSI information can include a set of historic RSSIs for historically received RF signals, a service set identifier (SSID) correlated to the historic RSSI information, e.g., a name that identifies a particular local wireless resource correlated with the historic RSSI information, and a date corresponding to the last time the SSID was correlated to the historic RSSI information.

RSSI-ICC 210 and RSSI-HIC 220 can be communicatively coupled to snapshot analysis component 230. Snapshot analysis component 230 can analyze a RSSI snapshot to determine a probability that a local wireless resource is available. In an embodiment, this analysis can be based, in part, on received historical RSSI information, e.g., received by way of RSSI-HIC 220. Snapshot analysis component 230 can further include decision engine component 232 that can facilitate forming determinations relating to a determining a probability that a local wireless resource is available. Determinations can include satisfying a snapshot analysis rule, not satisfying a snapshot analysis rule, satisfying part of a snapshot analysis rule, applying a snapshot analysis rule to a set of information, etc. A determination relating to a snapshot analysis rule can be related to historical RSSI information. As a first example, where a snapshot analysis rule is satisfied when a current RSSI snapshot is matches at least 95% a set of received historical RSSI information, decision engine component 232 can determine that this rule is satisfied by comparing a RSSI snapshot to at least one set of historic RSSI information. As a further example, decision engine component 232 can apply a weighting rule to snapshot analysis, such as where a weighting rule indicates that a weighting factor of 10× is to be applied to sets of historic RSSI information less than one hour old, e.g., where historic RSSI information is newer it can be associated with a greater weight in determining a probability that a local wireless resource is, or is not, available. Numerous other examples of specific snapshot analysis rules are not explicitly recited for brevity but are to be considered within the scope of the present disclosure.

In an aspect, decision engine component 232 can include rule component 234 to facilitate forming determinations related to a snapshot analysis rule. Rule component 234 can facilitate employing one or more snapshot analysis rules. These snapshot analysis rules can include rules for determining a probability relating to the availability of a local wireless resource. As an example, a rule can indicate that a local wireless resource must be strongly correlated with a set of historical RSSI information to be included as an available local wireless resource wherein a RSSI snapshot is sufficiently similar to the set of historical RSSI information to be deemed to match. In an embodiment, rule component 234 can be a rule engine that allows the application of logical determinations to be embodied in one or more algorithms related to snapshot analysis. As non-limiting examples, rule component 234 can generate a snapshot analysis rule, modify a snapshot analysis rule, delete a snapshot analysis rule, select a snapshot analysis rule as relevant/irrelevant, merge or diverge other snapshot analysis rules, etc.

Figure 3:
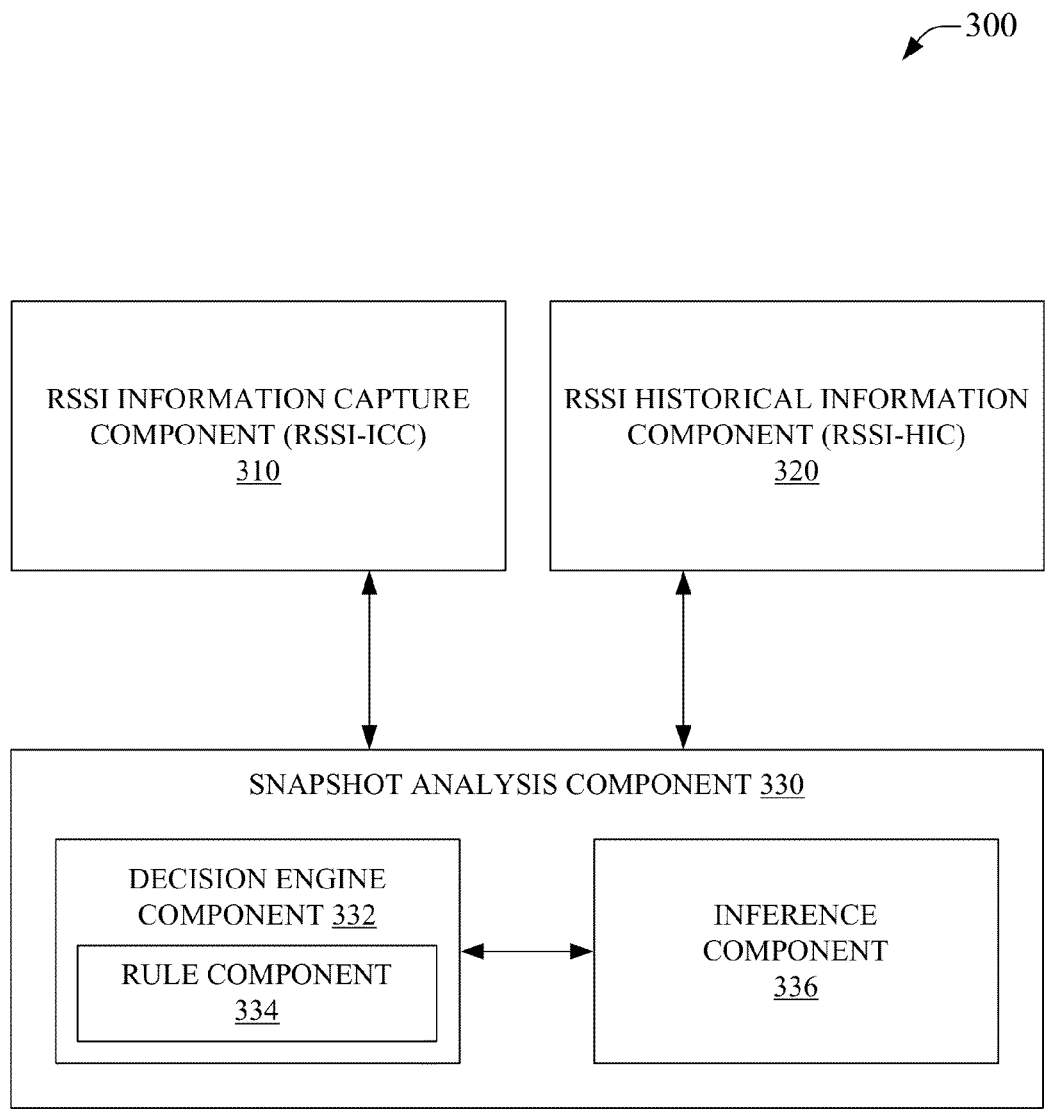
FIG. 3 illustrates a system that facilitates RSSI snapshot analysis employing an inference in accordance with aspects of the subject disclosure.

FIG. 3 illustrates a system 300, which facilitates RSSI snapshot analysis employing an inference in accordance with aspects of the subject disclosure. System 300 can include RSSI-ICC 310. RSSI-ICC 310 can facilitate capturing RSSI information. The RSSI information can be a set of RSSIs for one or more received RF signals or can be an empty set, such as where there are no received RF signals. The RSSI information received with the assistance of RSSI-ICC 210 can be independent of actual location information. System 300 can also include RSSI-HIC 320. RSSI-HIC 320 can assist system 300 to receive historical RSSI information. Historical RSSI information can include any information that can facilitate an analysis of a current RSSI snapshot to determine a probability related to the availability of a local wireless resource.

RSSI-ICC 310 and RSSI-HIC 320 can be communicatively coupled to snapshot analysis component 330. Snapshot analysis component 330 can analyze a RSSI snapshot to determine a probability that a local wireless resource is available. This analysis can be based, in part, on received historical RSSI information. Snapshot analysis component 330 can further include decision engine component 332 that can facilitate forming determinations relating to a determining a probability that a local wireless resource is available. Decision engine component 332 can include rule component 334 to facilitate forming determinations related to a snapshot analysis rule. Rule component 334 can facilitate employing one or more snapshot analysis rules. These snapshot analysis rules can include rules for determining a probability relating to the availability of a local wireless resource.

Snapshot analysis component 330 can further include inference component 336. Inference component 336 can receive an inference relating to the probability that a local wireless resource is available. In an embodiment, inference component 336 can facilitate automating one or more features in accordance with the subject innovation. Various machine learning and reasoning (MLR) based schemes for carrying out aspects of the disclosed subject matter can be employed. For example, a process for determining a probability that a local wireless resource is available can be facilitated by way of an automatic classifier system and process.

A classifier can be a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis, e.g., one factoring into the analysis the similarity or dissimilarity between the RSSI snapshot and the historical RSSI information, to prognose or infer an action that a user can desire to be automatically performed.

As used herein, terms "to infer" and "inference" refer generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the presently disclosed subject matter can employ classifiers that are explicitly trained (e.g., via a generic training data) as well as implicitly trained (e.g., via observing user behavior, receiving extrinsic information). For example, SVM's can be configured by way of a learning or training phase. Thus, the classifier can be employed to automatically learn and perform a number of functions according to predetermined criteria.

In one example, inference component 336 can monitor actual available local wireless resources in light of determined probabilities of those local wireless resources being available to learn and reason about patterns of availability with respect to RSSI snapshot analysis. In another example, learning and reasoning can be applied to information gleaned from other sources indicating newly added local wireless resources by affiliation with existing local wireless resources that can be associated with historical RSSI information, for instance, an office can deploy a new Wi-Fi network, e.g., a second network, to decrease the burden on an existing Wi-Fi network that is already associated with a set of historical RSSI information. As a further example, learning can be predicated on tracking of user behavior, for instance, where a user manually enables a Wi-Fi radio on a UE, this can be correlated with a RSSI snapshot. This can facilitate learning and future inferences that the RSSI snapshot is associated with one or more local wireless resources.

In yet another example, inference component 336 can facilitate learning and reasoning about changes in user interest, intentions, needs, and goals over time, thereby affecting changes in predicting the availability of a local wireless resource. As an example, a user can select local wireless resources with high bandwidth levels but ignore local wireless resources with low bandwidth levels. This can lead to modifying the probability of an available local wireless resource to include only high bandwidth level wireless resources as available and treating low bandwidth level wireless resources as unavailable, e.g., learning that wireless resources not meeting a predetermined threshold bandwidth can be treated as unavailable. These are only but a few examples of the capabilities provided by inference component 336, and are not to be construed as limiting in any way.

Machine learning algorithms have a set of inputs, and produce an output (typically a probability). They can be trained up using "training data" and then can be run on test data. For example, 10,000 examples of RSSI snapshots and 10,000 examples of correlated available local wireless resources can be employed. For each of these 20,000 examples, the system can be given a set of inputs, for instance, sets of exemplary historical RSSI information. Large samples of high probability availability of a local wireless resource can be obtained from location-based services, e.g., those using mapping of local wireless resources to locations derived from RSSI information, such as databases of available Wi-Fi hotspots by location correlated to RSSI information.

Figure 4:
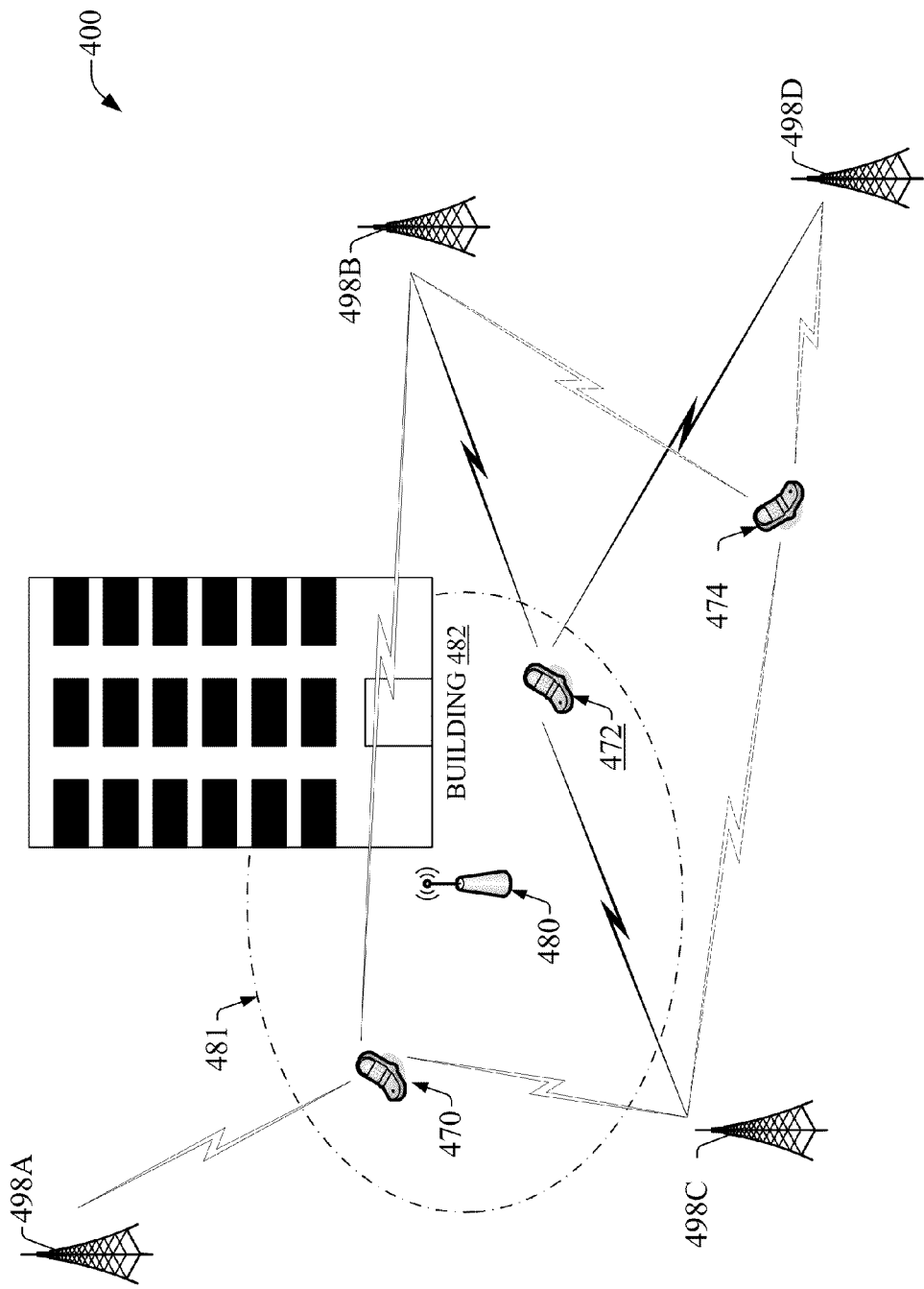
FIG. 4 illustrates an exemplary system including RSSI snapshot analysis in accordance with aspects of the subject disclosure.

FIG. 4 is illustrates an exemplary system 400 including RSSI snapshot analysis in accordance with aspects of the subject disclosure. System 400 can include NodeBs 498A-D. The NodeBs 498 A-D Wi-Fi hotspot 480 can provide wireless access through area 481. Building 482 can cause attenuation of RF signals passing through it.

UE 472 can receive RSSI information for RF signals, as indicated by the solid bolts, associated with NodeBs 498B-D. This RSSI information can be included in an RSSI snapshot of UE 472. The RSSI snapshot of UE 472 can be associated with the availability of Wi-Fi hotspot 480 wherein UE 472 is within the range 481 of Wi-Fi hotspot spot 480. The RSSI information of the RSSI snapshot can be associated with the geometric orientation and environmental conditions of UE 472 with respect to NodeBs 498B-D but need not be associated with any particular location or mapping of UE 472.

UE 474 can also receive RSSI information, as indicated by the empty, broken-border-lined bolts, from NodeBs 498B-D. This RSSI information can be included in an RSSI snapshot of UE 474. The RSSI snapshot of UE 474 can receive the RSSI snapshot of UE 472 as historical RSSI information. This historical RSSI information can include the particular RSSIs resulting from the particular geometric orientation and environmental conditions of UE 472 at the time the historical RSSI snapshot was captured. The historical RSSI information can also include the association with any local wireless resources, e.g., Wi-Fi hotspot 480. UE 474 can include components of a system that can be the same as, or similar to, system 100, 200, or 300. As such, UE 474 can analyze the RSSI snapshot of UE 474 with regard to the historical RSSI information associated with UE 472 to determine a probability that a local wireless resource is available.

The analysis of the RSSI snapshot of UE 474 with regard to the historical RSSI information associated with UE 472 can indicate that UE 474 is not similarly geometrically oriented, in the same environmental conditions, or a combination thereof. Based on this determination, a probability can be determined as to the availability of Wi-Fi hotspot 480 for UE 474. The analysis can be based on one or more snapshot analysis rules as disclosed herein. For instance, it can be determined that UE 474 is receiving RF signals from the same NodeBs as UE 472, e.g., NoedBs 498B-D, but that the RSSI values are sufficiently different that there is a low probability that Wi-Fi hotspot 480 is available to UE 474. The differences in the RSSI values can be a result of different geometric orientation and/or different environmental conditions. However, where the present disclosure is ignorant of the actual location of the exemplary UE, it is not possible to differentiate the cause of the differences in the RSSIs comprising the RSSI snapshot for UE 474. Based on this exemplary determination of a low probability of the availability of Wi-Fi hotspot 480, UE 474 can cause a Wi-Fi radio of UE 474 (not illustrated) to remain or go into an off/low power condition to conserve battery life. Where the difference in RSSIs for the RSSI snapshot of UE 474 is actually at least partly related to UE 474 being in a different geometric orientation, as illustrated in system 400, the probability can be associated with a correct result.

In contrast, similar conditions can exist for UE 470. That is, UE 470 can also receive RSSI information, as indicated by the empty, solid-border-lined bolts, from NodeBs 498B-D. This RSSI information can be included in an RSSI snapshot of UE 470. The RSSI snapshot of UE 470 can receive the RSSI snapshot of UE 472 as historical RSSI information. This historical RSSI information can include the particular RSSIs resulting from the particular geometric orientation and environmental conditions of UE 472 at the time the historical RSSI snapshot was captured. The historical RSSI information can also include the association with any local wireless resources, e.g., Wi-Fi hotspot 480. UE 470 can include components of a system that can be the same as, or similar to, system 100, 200, or 300. As such, UE 470 can analyze the RSSI snapshot of UE 470 with regard to the historical RSSI information associated with UE 472 to determine a probability that a local wireless resource is available.

The analysis of the RSSI snapshot of UE 470 with regard to the historical RSSI information associated with UE 472 can indicate that UE 470 is not similarly geometrically oriented, in the same environmental conditions, or a combination thereof. Based on this determination, a probability can be determined as to the availability of Wi-Fi hotspot 480 for UE 470. The analysis can be based on one or more snapshot analysis rules as disclosed herein. For instance, it can be determined that UE 470 is receiving RF signals from some of the same NodeBs as UE 472, e.g., NoedBs 498B and 498 C, and also receiving RF signals from a different NodeB, e.g., Node B 498A. In some embodiments, snapshots including different RF sources can affect a determination of a probability that a local wireless resource is available. In this example, where there are two of the three same RF sources, e.g., NodeBs 498B and 498C, the RSSI values can be sufficiently different that there is a low probability that Wi-Fi hotspot 480 is available to UE 470. The differences in the RSSI values can be a result of different geometric orientation and/or different environmental conditions. However, where the present disclosure is ignorant of the actual location of the exemplary UE, it is not possible to differentiate the cause of the differences in the RSSIs comprising the RSSI snapshot for UE 470. Based on this exemplary determination of a low probability of the availability of Wi-Fi hotspot 480, UE 470 can cause a Wi-Fi radio of UE 470 (not illustrated) to remain or go into an off/low power condition to conserve battery life. Where the difference in RSSIs for the RSSI snapshot of UE 470 is actually at least partly related to UE 470 being in a different geometric orientation, as illustrated in system 400, the probability can be associated with an incorrect result, e.g., UE 470 is actually within the area of coverage 481 for Wi-Fi hotspot 480.

In an embodiment, where enough historical RSSI information is amassed, it can be appreciated that the boundaries of region 481 associated with wireless resource coverage from Wi-Fi hotspot 480 can be associated with a plurality of sets of historical RSSI information to provide any algorithms computing a probability with a better chance of converging on a solution that is correct rather than incorrect. For example, where there is a set of historical RSSI information for large numbers of geometric orientations if UEs within region 481, it becomes less mathematically likely that the differences between a RSSI snapshot and a set of historical RSSI information will be a result of differences in geometric orientation. Where environmental conditions are also highly sampled for each geometric orientation, it is also likely that differences between a RSSI snapshot and historical RSSI information can be better characterized. Huge data stores of historical RSSI information are therefore likely to provide for an acceptable level of accuracy when determining a probability that a local wireless resource is available.

Moreover, in some embodiments, e.g., those that include inference components, training and learning can improve accuracy and reduce the likelihood of a probability being associated with an incorrect result. As an example, where UE 470 and/or UE 474 both scan for available Wi-Fi networks when capturing a RSSI snapshot, for instance in a 'learning mode', the probability can be validated. That is, where the probability for UE 474 was that a local wireless resource was not available, this can be confirmed by scanning for Wi-Fi hotspot 480 and not finding it. This information can be added to the data store of historical RSSI information to be used for later determinations. This information can also be employed as training data for an inference component (not illustrated). Similarly, the incorrect result for UE 470 can be noted and included in the historical RSSI information database and/or used for classifier training. It will be noted that this 'learning mode' would be associated with power consumption for scanning a Wi-Fi radio of the UEs to validate the probability determination. It will also be noted that there is no need to determine the location of any UE in system 400 for the determination of a probability that a local wireless resource is available based on the analysis of an RSSI snapshot in view of historical RSSI information.

Figure 5:
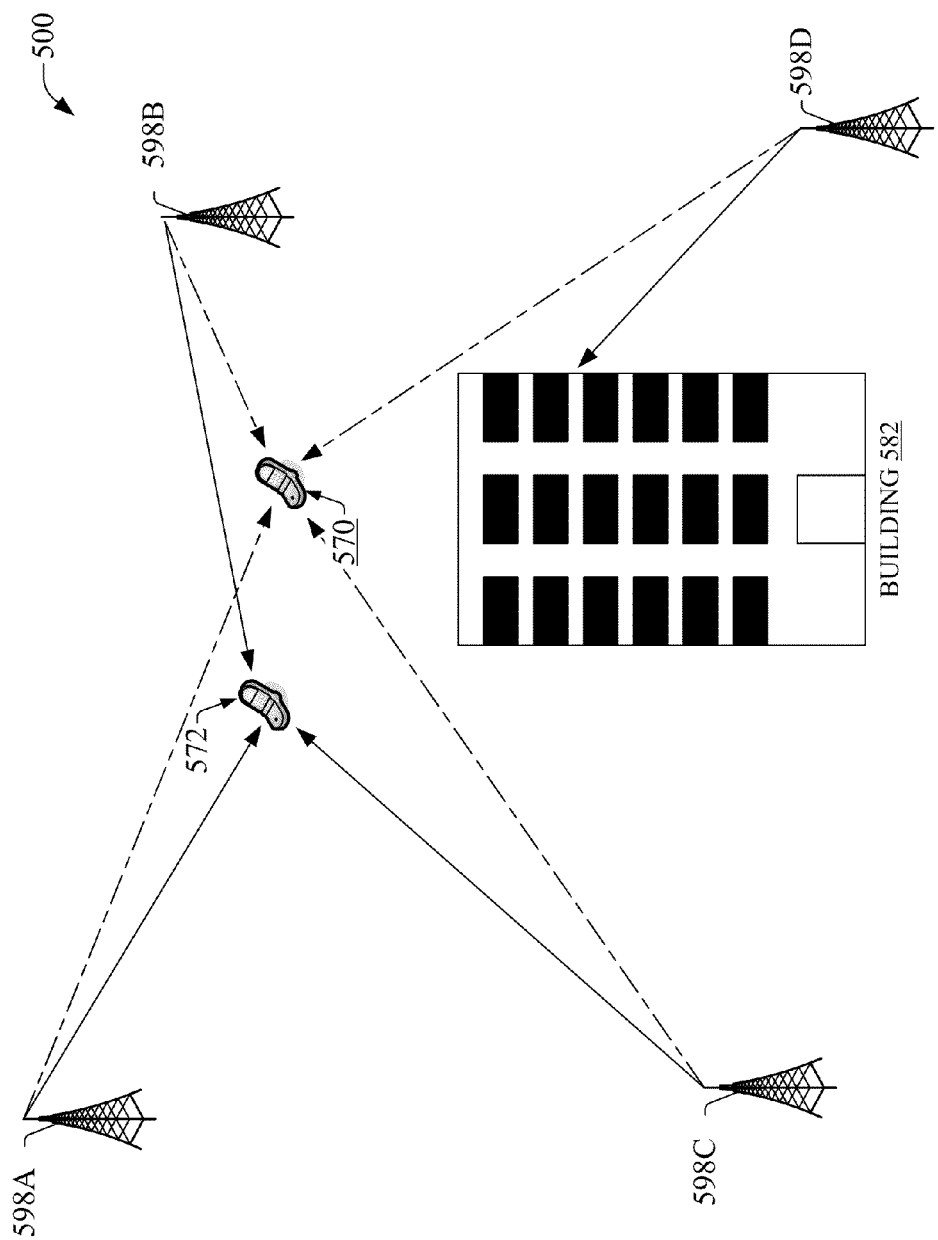
FIG. 5 illustrates an exemplary system including inference based RSSI snapshot analysis in accordance with aspects of the subject disclosure.

FIG. 5 illustrates an exemplary system 500 including inference based RSSI snapshot analysis in. System 500 can include building 582 that can attenuate RF signals as illustrated. UE 570 can receive RSSI information for RF signals, as indicated by the broken line arrows, associated with NodeBs 598A-D. This RSSI information can be included in an RSSI snapshot of UE 570. The RSSI snapshot of UE 570 can be associated with the availability of local wireless resources (not illustrated). The RSSI information of the RSSI snapshot can be associated with the geometric orientation and environmental conditions of UE 570 with respect to NodeBs 498A-D but need not be associated with any particular location or mapping of UE 570.

UE 572 can also receive RSSI information, as indicated by the solid-line arrows, from NodeBs 498A-C. This RSSI information can be included in an RSSI snapshot of UE 572. The RSSI snapshot of UE 572 can receive the RSSI snapshot of UE 570 as historical RSSI information. This historical RSSI information can include the particular RSSIs resulting from the particular geometric orientation and environmental conditions of UE 570 at the time the historical RSSI snapshot was captured. The historical RSSI information can also include the association with any local wireless resources. UE 572 can include components of a system that can be the same as, or similar to, system 300. As such, UE 572 can analyze the RSSI snapshot of UE 572 with regard to the historical RSSI information associated with UE 570 to determine a probability that a local wireless resource is available.

The analysis of the RSSI snapshot of UE 572 with regard to the historical RSSI information associated with UE 570 can indicate that UE 572 is not identically geometrically oriented, in the same environmental conditions, or a combination thereof. Based on this determination, a probability can be determined as to the availability of any local wireless resources for UE 572. The analysis can be based on one or more snapshot analysis rules as disclosed herein. For instance, it can be determined that UE 572 is receiving RF signals from three of the four same NodeBs as UE 570, e.g., NoedBs 498A-C. This condition can be included in determine the probability. Further, where exemplary UE 572 includes an inference component (not illustrated) that is the same as, or similar to, that inference component 336 of system 300, an inference can be made as to the probability determination.

The inference can be influenced by training of the inference component or on learning that the inference component may have experience, e.g., by additional training in a 'learning mode' as disclosed herein. As a first example, an inference can be that where three of the four RF sources from historical RSSI information are present in a RSSI snapshot for UE 572, that the missing RF source can be of minimal importance and as such, this factor should be associated with a weighting factor to minimize the impact of this factor. This inference can be based on the magnitude of the difference between the snapshot and historical RSSI information for the remaining RF sources, e.g., where the differences do not transition a threshold value, the missing RF source in minimally important while if the difference do transition the threshold value then the missing RF source can be more substantially important. This can account, for example, when an object moves between a RF source and a UE blocking just one of the RF sources while there is no substantial change in the RSSI values for the remaining RF sources. In this example, there would likely not be a change in any available local wireless resource and the impact of the loss of one of the RF sources with little change in the remaining RF sources should not overwhelm a determination of a probability as disclosed. Similarly, where one RF source is lost and the RSSI values of the remaining RF sources changes substantially, such as when a UE might enter a building or tunnel, this can be learned to be more likely associated with a change in the availability of local wireless resources and can therefore be associated with an increased weighting of this factor.

A further exemplary inference can be temporally based. A temporal inference can apply, for instance, a weighting factor with a greater effect on determining a probability as the more time elapses between an RSSI snapshot and historical RSSI information. This example can be appreciated by noting that where a large change in RSSI values occurs over a short time period it can be associated with more drastic changes in either geometric orientation or environmental conditions. As an example, where a loss of 5 dB in RSSI is found when analyzing a RSSI snapshot in view of historical RSSI information that is three weeks old, that this loss may be simply due to weather conditions and that the probability should be less influenced by these older factors. In contrast, where a 5 dB loss is found in view of historic RSSI information that is only 30 seconds old, there can be an inference that the loss is due to a change in geometric orientation or a substantial environmental change, and that this should more substantially impact determination of a probability of a local wireless resource being available.

As illustrated in system 500, the geometric orientation of UE 572 with regard to UE 570 can be minimal, e.g., the loss of RF signal from NodeB 598D is simply a result of UE 572 being in the RF shadow of building 582. In system 500, an inference can be that minimal changes in the RSSI values form the remaining RF sources, e.g., NodeB 598A-C can indicate that loss of RF signal from NodeB 598D are to be minimized by applying a weighting factor when determining a probability that a local wireless resource is available.

Figure 6:
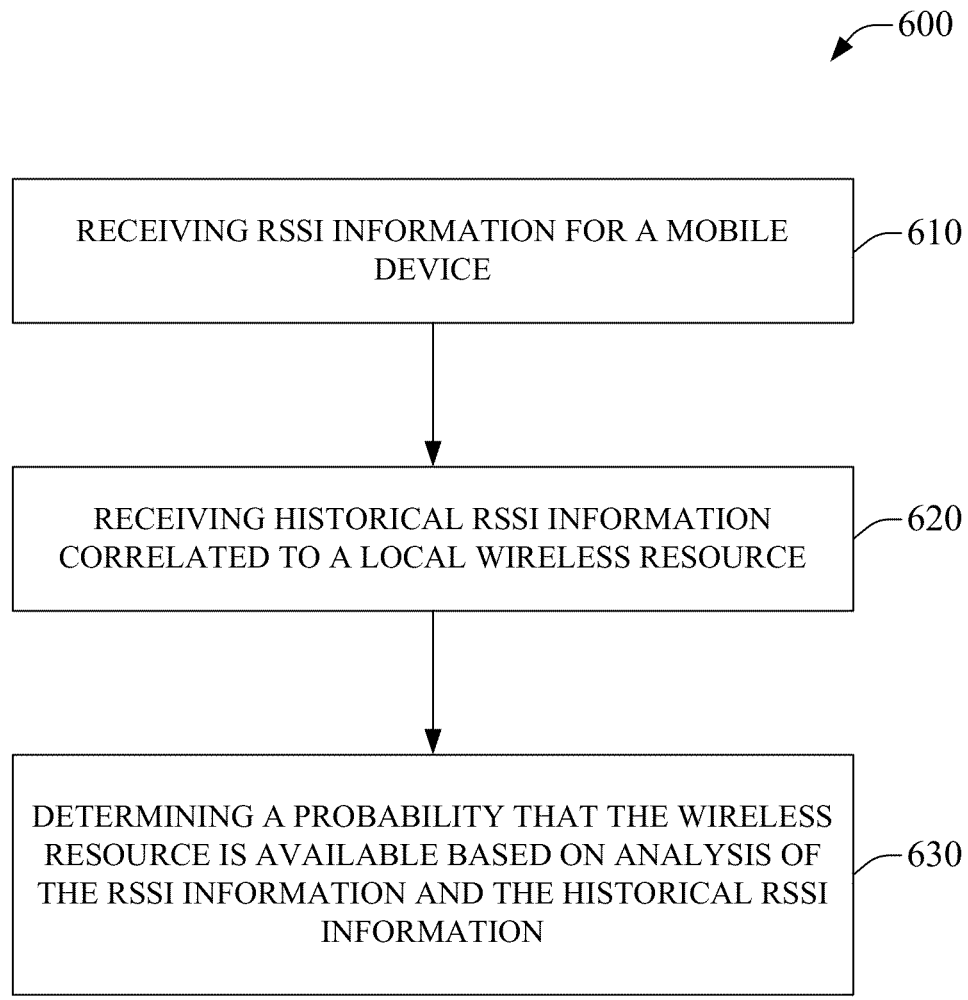
FIG. 6 illustrates a method facilitating RSSI snapshot analysis in accordance with aspects of the subject disclosure.
Figure 7:
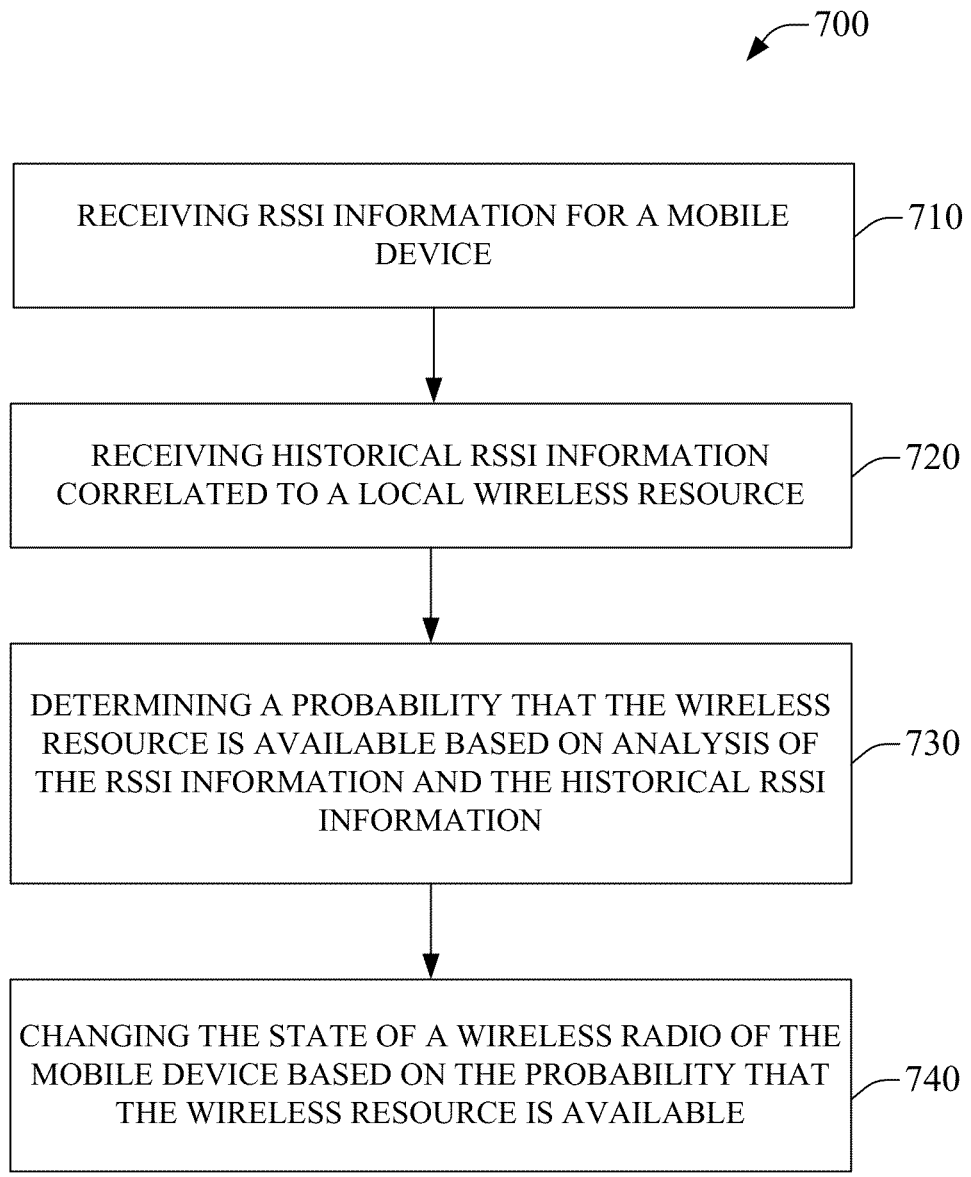
FIG. 7 illustrates a method for changing the state of a wireless radio based on RSSI snapshot analysis in accordance with aspects of the subject disclosure.
Figure 8:
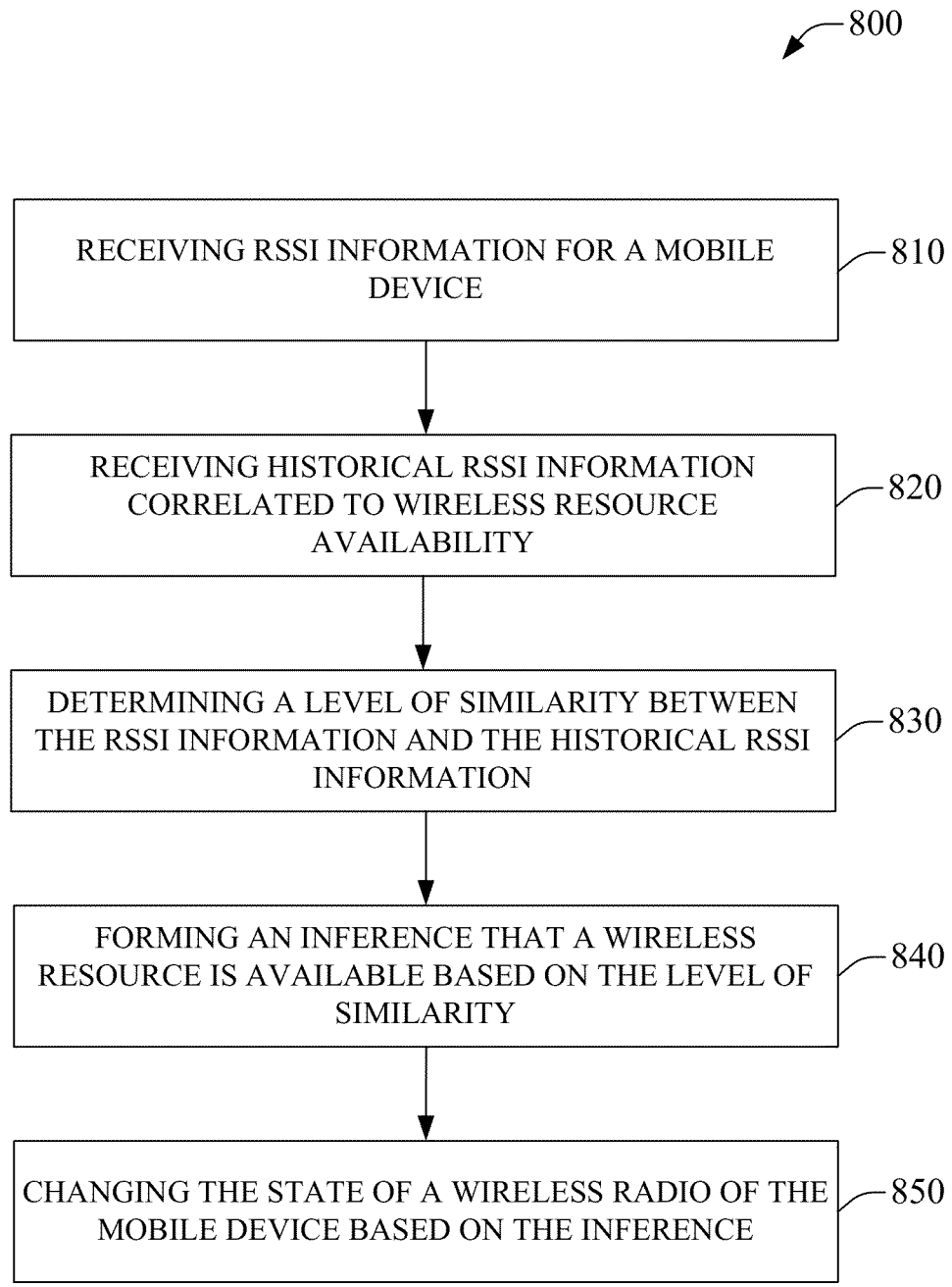
FIG. 8 illustrates a method facilitating RSSI snapshot analysis based on inference in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of a method 600 facilitating RSSI snapshot analysis in accordance with aspects of the subject disclosure. At 610, RSSI information for a mobile device can be received. The RSSI information can include a set of RSSI values for one or more RF signals or can be an empty set. The RSSI information received can be independent of actual location information. The RSSI information can be included in an RSSI snapshot associated with the mobile device, as disclosed herein.

At 620, historical RSSI information can be received. This historical RSSI information can be correlated to a local wireless resource. Historical RSSI information can include one or more historic RSSI snapshots. Historical RSSI information can also include other RSSI information such as identification information of historically received RF signals, identification information for correlated local wireless resources, etc. Historical RSSI information can include any information that can facilitate an analysis of a current RSSI snapshot to determine a probability related to the availability of a local wireless resource.

At 630, a probability that the local wireless resource is available can be determined This determination can be based on an analysis of the RSSI information, e.g., the RSSI snapshot, and the historical RSSI information. At this point, method 600 can end. In an aspect, instant RSSI information can be compared to histrionic RSSI information. Where the instant RSSI information matches a set of historic RSSI information or satisfies one or more rules relating to the comparison, a level of confidence can be associated with the mobile device being in the same, or a similar, geometric orientation and/or in the same, or similar, environmental conditions as a UE associated with the historic RSSI information. Thus, where a local wireless resource was available for the UE associated with the historic RSSI information, said same local wireless resource can similarly be available to the mobile device. The comparison of an RSSI snapshot to historic RSSI information in method 600 can be independent of any conversion of RSSI data into location information or map information.

FIG. 7 illustrates aspects of a method 700 for changing the state of a wireless radio based on RSSI snapshot analysis in accordance with aspects of the subject disclosure. At 710, RSSI information for a mobile device can be received. The RSSI information can include a set of RSSI values for one or more RF signals or can be an empty set. The RSSI information received can be independent of actual location information. The RSSI information can be included in an RSSI snapshot associated with the mobile device, as disclosed herein.

At 720, historical RSSI information can be received. This historical RSSI information can be correlated to a local wireless resource. Historical RSSI information can include one or more historic RSSI snapshots. Historical RSSI information can also include other RSSI information such as identification information of historically received RF signals, identification information for correlated local wireless resources, etc. Historical RSSI information can include any information that can facilitate an analysis of a current RSSI snapshot to determine a probability related to the availability of a local wireless resource.

At 730, a probability that the local wireless resource is available can be determined This determination can be based on an analysis of the RSSI information and the historical RSSI information. In an embodiment, the instant RSSI information can be analyzed in light of the received histrionic RSSI information. Where the instant RSSI information matches a set of historic RSSI information or satisfies one or more snapshot analysis rules, a probability can be determined that a local wireless resource is available to the mobile device. The comparison of an RSSI snapshot to historic RSSI information in method 700 can be independent of any conversion of RSSI data into location information or map information.

At 740, a state of a wireless radio of the mobile device can be changed based on the probability that the local wireless resource is available. At this point, method 700 can end. In an aspect, where a wireless radio of a mobile device consumes power when enabled, it can be desirable to place the wireless radio in a disabled state associated with lower power consumption when the wireless radio is not in use. As such, where a local wireless resource is not available, having the wireless radio of the mobile device enabled is superfluous. Therefore, where the RSSI snapshot analysis indicates that a local wireless resource is not likely available, a determination to disable, or keep disabled, the wireless radio can be employed to conserve battery power. Similarly, where a local wireless resource is available, the wireless radio can be enabled to take advantage of the resource where otherwise desirable. The determined probability can be employed as a metric when selecting an enabled or disable sate for a wireless radio of the mobile device by method 700 or similar methods.

It will be noted that method 700 can be combined with other methods and techniques to enable advanced wireless radio state selection. As an example, method 700 can facilitate determining a probability that if a local wireless resource is available. Another method can determine if access to a local wireless resource is desirable, for instance, based on an amount of data to be transmitted, the traffic level of other wireless resources such as cellular traffic, etc. Where the probability value transitions a predetermined value and access to the local wireless resource is desirable as determined by the complimentary method, a wireless radio state can be enabled for the mobile device. Similar types of compound analyses can be conducted to set a wireless radio state as disabled or off to conserve power when no network is likely available and/or there is a sufficiently low need for the use of such a local wireless resource. It will be noted that numerous other examples fall within the present scope despite not be expressly disclosed for the sake of clarity and brevity.

FIG. 8 illustrates a method 800 facilitating RSSI snapshot analysis based on inference in accordance with aspects of the subject disclosure. At 810, RSSI information for a mobile device can be received. The RSSI information can include a set of RSSI values for one or more RF signals or can be an empty set. The RSSI information received can be independent of actual location information. The RSSI information can be included in an RSSI snapshot associated with the mobile device, as disclosed herein.

At 820, historical RSSI information can be received. This historical RSSI information can be correlated to a local wireless resource. Historical RSSI information can include one or more historic RSSI snapshots. Historical RSSI information can also include other RSSI information such as identification information of historically received RF signals, identification information for correlated local wireless resources, etc. Historical RSSI information can include any information that can facilitate an analysis of a current RSSI snapshot to determine a probability related to the availability of a local wireless resource.

At 830, a level of similarity between the instant RSSI information and the historical RSSI information can be determined. This determination can be based on an analysis of the RSSI information and the historical RSSI information. In an embodiment, the instant RSSI information can be analyzed in light of the received histrionic RSSI information. The instant RSSI information can be the same as, or is similar to, a set of historic RSSI information and this level of similarity can be quantified. The quantification can be based on one or more rules relating to comparison of RSSI information. The comparison of an RSSI snapshot to historic RSSI information in method 800 can be independent of any conversion of RSSI data into location information or map information.

At 840, an inference can be formed relating to the availability of a local wireless resource. This inference can be based on the determined level of similarity between the RSSI snapshot and the historical RSSI information, wherein the historical RSSI information can include correlated local wireless resource information. In an aspect, where an RSSI snapshot is more similar to a set of historical RSSI information, it can be more likely that a local wireless resource associated with the set of historical RSSI information will also be available to the mobile device receiving the RSSI snapshot. Correspondingly, an inference can be that the more dissimilar an RSSI snapshot from a set of historical RSSI information, the less likely there is to be a local wireless resource available that was correlated to the historic RSSI information.

In an aspect, if an actual photo of an instant set of RSSI information could be taken and laid against photos of historical sets of RSSI information, an inference could be that the closer the match between the instant and historical photos the more similarities they are likely to share. Where an instant photo and a historical photo are sufficiently similar, it can be inferred that if the historic photo includes a Wi-Fi network, then the instant photo will also have the same Wi-Fi network. This exemplary 'photo-lineup' does not require that the locations of the photos ever be determined because the comparison itself is based on the content of the photos and how they compare to one another rather than to where they are taken. For instance, as an analogy, a historical photo of the Empire State building can be highly correlated with an instant photo of the Empire State building even where the photographic angles are different, the lighting is different, the weather on the days of the photo is different, etc. Further, it is unimportant where the Empire State building is located to determine that the two photos are sufficiently similar and likely are photos of the same building. Where it is known that the Empire State building has 73 elevators in the historic photo, it can be inferred that the building in the instant photo also has 73 elevators. It will be noted that the more dissimilar the parameters of the instant photo are form the historic photo of the Empire State building, the less likely it can be to draw a conclusion that the two pictured buildings are the same and therefor there can be a lower probability that the building in the instant photo has 73 elevators.

At 840, a state of a wireless radio of the mobile device can be changed based on the inference. At this point, method 800 can end. In an aspect, where a wireless radio of a mobile device consumes power when enabled, it can be desirable to place the wireless radio in a disabled state associated with lower power consumption when the wireless radio is not in use. The inference can be employed as a metric when selecting an enabled or disable sate for a wireless radio of the mobile device by method 800 or similar methods.

Figure 9:
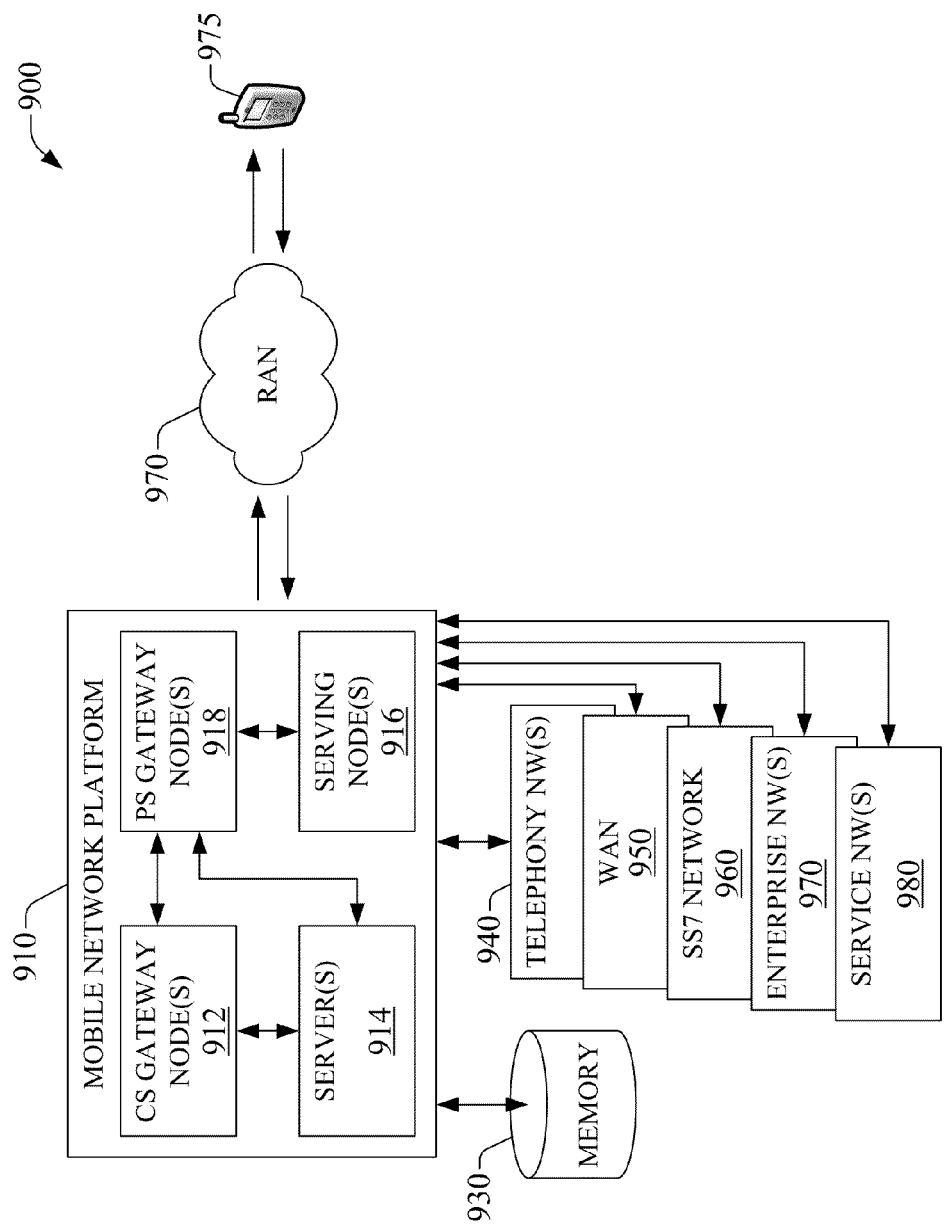
FIG. 9 is a block diagram of an exemplary embodiment of a mobile network platform to implement and exploit various features or aspects of the subject disclosure.

FIG. 9 presents an example embodiment 900 of a mobile network platform 910 that can implement and exploit one or more aspects of the subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included as part of a telecommunications carrier network. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Further, RSSI information can be stored in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, can be provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
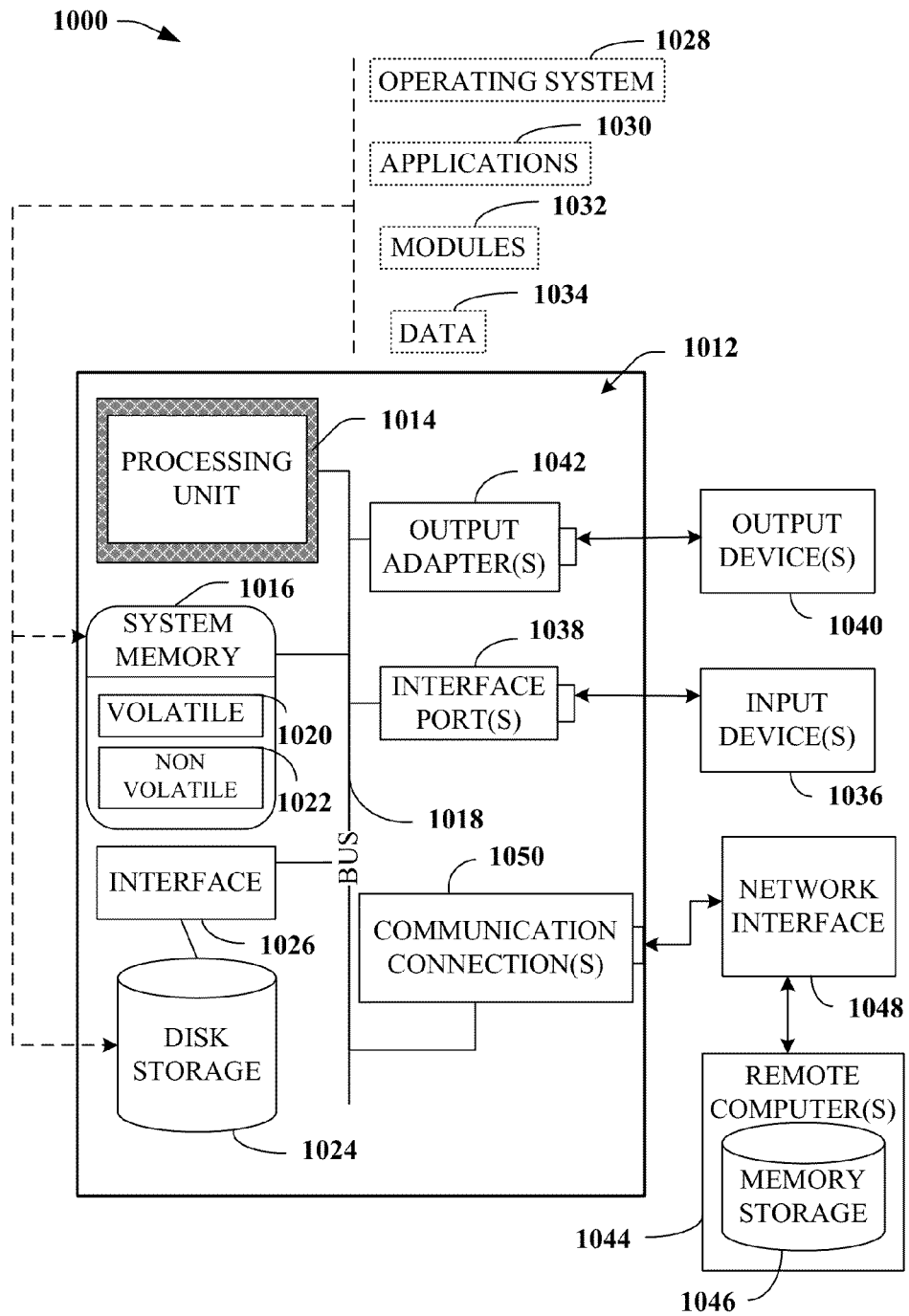
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory, for example, can be included in volatile memory 1020, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012 includes a processing unit 1014, a system memory 1016, and a system bus 1018. In an embodiment, computer 1012 can be all or part of the hardware comprising a snapshot analysis component such as component 130, 230 or 330. In a further embodiment, computer 1012 can be part of a UE configured to perform snapshot analysis. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface can be used, such as interface 1026. In an embodiment, disk storage 1024 can store historic RSSI information to facilitate analysis of a RSSI snapshot. In another embodiment, disk storage 1024 can store RSSI snapshot information. In a further embodiment, determined probabilities relating to the availability of a local wireless resource can be stored on disk storage 1024.

Computing devices can include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and can include many or all of the elements described relative to computer 1012.

For purposes of brevity, only a memory storage device 1046 is illustrated with remote computer(s) 1044. Remote computer(s) 1044 can be logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which can be operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the term "core-network", "core", "core carrier network", or similar terms can refer to components of a telecommunications network that provide some or all of aggregation, authentication, call control and switching, charging, service invocation, or gateways. Aggregation can refer to the highest level of aggregation in a service provider network wherein the next level in the hierarchy under the core nodes can be the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Zigbee, other 802.XX wireless technologies, Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving signal strength indicator information associated with a user equipment;
   receiving historical signal strength indicator information comprising information relating to a historically available local wireless resource device; and
   determining a probability that a wireless resource is available, wherein the probability is based on the signal strength indicator information, independent of a location determination, the information relating to the historically available local wireless resource device, independent of the location determination, and the historical signal strength indicator information, independent of the location determination.

2. The system of claim 1, wherein the signal strength indicator information comprises signal strength indicator values associated with a received radio frequency signal.

3. The system of claim 1, wherein the historical signal strength indicator information comprises at least one set of historical signal strength indicators, and wherein the at least one set of historical signal strength indicators comprises historical signal strength indicator values associated with historically received radio frequency signals.

4. The system of claim 3, wherein the determining the probability comprises determining a level of similarity between the signal strength indicator information and the at least one set of historical signal strength indicator information.

5. The system of claim 1, wherein the determining the probability comprises determining a level of similarity between the signal strength indicator information and the historical signal strength indicator information.

6. The system of claim 1, wherein the probability is a probability that a historically available local wireless resource device is presently available and is determined, at least in part, by comparing the signal strength indicator information and the historical signal strength indicator information without determining a location and in the absence of an association of the location with the historically available local wireless resource device.

7. The system of claim 1, wherein the determining further comprises determining that a condition relating to analysis of the signal strength indicator information and the historical signal strength indicator information is satisfied.

8. The system of claim 7, wherein the determining further comprises receiving a rule associated with the signal strength indicator information and the historical signal strength indicator information.

9. The system of claim 1, further comprising, forming an inference relating to the probability that a historically available local wireless resource device is presently available.

10. The system of claim 9, wherein the inferring comprises a trained classifier.

11. The system of claim 1, wherein an enabled-disabled state, for a wireless radio device associated with the user equipment, is determined based on the probability.

12. A method, comprising:
    receiving, by a system comprising a processor, signal strength indicator information associated with a user equipment;
    receiving, by the system, historical signal strength indicator information comprising correlation information for a historical signal strength indicator value and a historical availability of a local wireless resource device, wherein the correlation information is not based on location information related to the local wireless resource device; and
    determining, by the system, a probability that a wireless resource is available, wherein the probability is based on the signal strength indicator information and the historical signal strength indicator information.

13. The method of claim 12, wherein the determining the probability includes determining the probability based on a level of similarity between the signal strength indicator information and the historical signal strength indicator information.

14. The method of claim 12, wherein the receiving historical signal strength indicator information includes receiving other information relating to a historically available local wireless resource.

15. The method of claim 14, wherein the determining the probability includes determining a probability that the historically available local wireless resource is presently available.

16. The method of claim 12, wherein the determining the probability includes forming an inference relating to the historical signal strength indicator information.

17. The method of claim 16, further comprising designating, by the system, an enabled-disabled state, for a wireless radio device associated with the user equipment, based on the probability.

18. A computer-readable storage device storing executable instructions that, in response to execution, cause a system comprising a processor to perform operations, comprising:
    receiving signal strength indicator information associated with a user equipment;
    receiving historical signal strength indicator information comprising information relating to a correlation, not based on location information, between a historical availability of a local wireless resource device and a historical signal strength indicator value; and
    determining a probability based on the signal strength indicator information and the historical signal strength indicator information, wherein the probability is related to a present availability of a historically available local wireless resource device.

19. The computer-readable storage device of claim 18, wherein the operations further comprise receiving, based on the probability, a control value related to a state transition for a wireless radio associated with the user equipment.

20. The computer-readable storage device of claim 19, wherein the control value is related to an enabled-disabled state for the wireless radio.

* * * * *